(12) United States Patent
Kerdelhue

(10) Patent No.: US 12,525,807 B2
(45) Date of Patent: Jan. 13, 2026

(54) AUTOMOBILE VEHICLE FAST CHARGING DEVICE

(71) Applicant: NW TECH, Paris (FR)

(72) Inventor: Jean-Christophe Kerdelhue, Paris (FR)

(73) Assignee: NW Tech, Paris (FR)

( * ) Notice: Subject to any disclaimer, the term of this patent is extended or adjusted under 35 U.S.C. 154(b) by 621 days.

(21) Appl. No.: 18/045,779

(22) Filed: Oct. 11, 2022

(65) Prior Publication Data

US 2023/0117226 A1 Apr. 20, 2023

(30) Foreign Application Priority Data

Oct. 15, 2021 (FR) ...................................... 2110953

(51) Int. Cl.
*H02J 3/32* (2006.01)
*B60L 53/53* (2019.01)
(Continued)

(52) U.S. Cl.
CPC .............. *H02J 3/322* (2020.01); *B60L 53/53* (2019.02); *B60L 53/63* (2019.02);
(Continued)

(58) Field of Classification Search
CPC .... H02J 3/007; H02J 3/388; H02J 3/38; H02J 3/32; H02J 3/322; H02J 3/003; H02J 3/40;
(Continued)

(56) References Cited

U.S. PATENT DOCUMENTS

2014/0088781 A1* 3/2014 Kearns .................... H02J 3/322
700/295
2015/0255984 A1 9/2015 Higashi
(Continued)

FOREIGN PATENT DOCUMENTS

CN 107 732 937 2/2018
CN 110 210 777 9/2019
(Continued)

OTHER PUBLICATIONS

French Search Report and Written Opinion, FR210953, dated Jun. 23, 2022.

*Primary Examiner* — Binh C Tat
(74) *Attorney, Agent, or Firm* — Knobbe, Martens, Olson & Bear, LLP

(57) ABSTRACT

The disclosure is directed to balancing equipment for a grid comprising: a grid input; a transformer comprising a first winding connected to the output of said grid input; a first inverter connected to said transformer; a system of batteries connected to said first inverter; a supervisory unit set up to activate said first inverter and to ensure the charging or discharging of said batteries when an imbalance is detected; and a second inverter connected at the input to said second winding of said transformer and at the output to at least one charging plug of an electric or hybrid vehicle; said supervisory unit being set up to activate said second inverter when a charging need is detected at said recharging plug and when the injection needs on the grid are lower than a threshold value.

8 Claims, 6 Drawing Sheets

(51) Int. Cl.
*B60L 53/63* (2019.01)
*G01R 19/165* (2006.01)
*G01R 31/3842* (2019.01)
*H02J 7/00* (2006.01)
*H02J 7/02* (2016.01)

(52) U.S. Cl.
CPC ... *G01R 19/16571* (2013.01); *G01R 31/3842* (2019.01); *H02J 7/0013* (2013.01); *H02J 7/02* (2013.01); *H02J 2207/20* (2020.01)

(58) Field of Classification Search
CPC .. H02J 3/004; H02J 3/001; H02J 3/008; H02J 3/12; H02J 3/00; H02J 3/381; H02J 2300/24; H02J 2300/20; H02J 2300/28; H02J 2300/10; H02J 3/14; H02J 3/0012; G01R 19/16571; G01R 31/086; G01R 31/36; G01R 31/3842; B60L 53/53; B60L 53/63; B60L 53/11; B60L 53/122; B60L 53/22; B60L 53/50; B60L 53/51

USPC .................................................. 320/108–115
See application file for complete search history.

(56) References Cited

U.S. PATENT DOCUMENTS

| | | | | |
|---|---|---|---|---|
| 2016/0248254 | A1* | 8/2016 | Huomo | H02J 13/00004 |
| 2018/0026550 | A1* | 1/2018 | Dent | H02J 7/35 |
| | | | | 363/55 |
| 2020/0001730 | A1 | 1/2020 | Gohla-Neudecker et al. | |

FOREIGN PATENT DOCUMENTS

| | | |
|---|---|---|
| CN | 112 510 756 | 3/2021 |
| WO | WO 2017/008055 | 1/2017 |
| WO | WO 2020/148850 | 7/2020 |
| WO | WO 2020/069188 | 4/2021 |
| WO | WO 2021/069189 | 4/2021 |

* cited by examiner

State of the art

State of the art

State of the art

State of the art

State of the art

AUTOMOBILE VEHICLE FAST CHARGING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 2110953 filed on Oct. 15, 2021, the contents of which are incorporated herein by reference in its entirety.

BACKGROUND

Field

The disclosure is directed to the field of charging devices for an automobile vehicle such as a car, or an electric or hybrid bus. These charging devices are also referred to "charging stations" and can be located in many different places, like private car parks, public car parks of shops or restaurants for example.

The disclosure is directed to a "fast" charging station.

Description of the Related Art

The development of electric or hybrid vehicles naturally goes hand in hand with the development of charging solutions for them. One of the points slowing down the increased use of all-electric vehicles is the time it takes to charge them. Indeed, this charging time is much longer than the time it takes to refuel an internal combustion engine vehicle. For example, on a long trip, a driver is more likely to use an ICE or hybrid vehicle than an all-electric one.

The charging of an electric (or hybrid) vehicle is done by charging one or several batteries connected to the vehicle's electrical network. To do this, the electric energy supplied by an electric power grid is conventionally AC voltage. The function of the charging station is to transform the AC voltage from the grid to a voltage level suitable for the battery and to transform the AC voltage into DC voltage.

A conventional charging station is connected to a power grid operating at 220V AC and has a grid input connected to a transformer that brings the AC voltage down to a level of around 50V, which is connected to an AC/DC converter itself connected to an electric vehicle charging plug.

With this now widely available charging station type, it typically takes 8 to 12 hours to fully charge an electric vehicle.

However, when power is being withdrawn from several charging stations connected to a grid at the same time, grid performance may falter. In an electricity grid, consumption should be balanced with production at the risk of otherwise causing the characteristics of the grid to vary, particularly its frequency. Accordingly, to mitigate this, the grid operator can use primary, secondary and tertiary reserves, which are connected on different time and power scales. For example, the primary reserve action time is less than 30 seconds, the secondary reserve less than 15 minutes and the tertiary reserve becomes effective in 30 minutes.

If an imbalance is detected, the primary reserves are automatically activated according to the frequency differences measured between the grid and a reference signal generated by transmission grid operator. When an imbalance occurs between generation and consumption, the frequency of the grid deviates from the required 50 Hz level, activating the primary reserve of the entities contributing to this primary reserve. Each of these entities needs to increase its injection power if the frequency is below 50 Hz or decrease its injection power or even withdraw current if the frequency is above 50 Hz. A new balance point between generation and consumption is thus obtained on the grid.

In order to achieve the necessary reactivity, the primary reserve comprises reserve entities connected to the high voltage grid or the medium voltage grid. An electric power transmission grid structure conventionally comprises several voltage levels, for example high-voltage lines carrying current at a voltage between 50 kV and 400 kV, medium-voltage lines with voltage between 1 kV and 50 kV and low-voltage lines with voltage of 220V. These lines are interconnected with transformer stations located between the different types of lines.

Battery powered equipment to participate as a reserve entity in the primary reserve typically usually comprises a set of very high capacity batteries charged to half their capacity so as to be able to inject or withdraw power from the grid if necessary. Similarly, this equipment participates in voltage regulation according to the specifications of the grid operator, by injection or withdrawal of reactive power.

The primary reserve should be sized to inject or restore a significant share of the grid's production and consumption. In Europe, the system of reserve entities forming the primary reserve represents a capacity of 3000 MW, e.g. the generating capacity of the two largest nuclear reactors in service. To achieve this total capacity, each reserve entity should be sized to have a capacity of at least 1 MW.

More specifically, as illustrated in FIG. 1, a battery 17 balancing unit 100 comprises a grid input 11 incorporating high-voltage or medium-voltage grid protection devices 12 and grid performance measurement devices 13 to detect power and voltage balancing needs. This grid input is connected to a step-down transformer 14. For example, when the balancing equipment is connected to the medium voltage grid, the transformer can be configured to transform a 20 kV AC voltage into a 450V AC voltage. The output of the transformer 14 is connected to an inverter 15 configured to convert the AC voltage to a DC voltage supplying a system 16 of batteries 17. A supervisory unit, not shown, measures the active and reactive power of the grid over time and commands the charging or discharging of the batteries 17 to compensate for grid imbalances.

In order to limit the subscribed power for connecting the equipment to the grid, it is also known for charging stations 101 for electric vehicles to incorporate one or more batteries, as illustrated in FIG. 2. This type of charging station 101 includes a transformer 12 stepping down the AC voltage of the low-voltage grid followed by an inverter 15 connected to a battery 17 and set up to adapt the voltage level to the battery 17.

The output of the inverter 15 is also connected to a DC/DC converter 18 connected to the electric vehicle charging plug and configured to match the voltage level to the electric vehicle. When the power demand exceeds a threshold value, the battery 17 is used to limit the demands that would also be brought to bear on the grid.

In addition, the battery 17 can be recharged after the charging phase of an electric vehicle. Although this design sets limits on the instantaneous power withdrawn from the grid, the charging time is no better than with a conventional charging station.

To improve the charging speed, a charging station directly connected to the high-voltage or medium-voltage grid can be used so that maximum power can be supplied to the electric vehicle. As illustrated in FIG. 3, this type of charging station 102 integrates a grid input 11 incorporating high-voltage or medium-voltage grid protection devices 12 and a voltage-lowering transformer 14.

The output of transformer 14 is connected to an inverter 15 set up to convert the AC voltage into a DC voltage supply to the electric vehicle's charging plug. This type of charging station is capable of charging an electric vehicle in 20 minutes.

Although this solution effectively improves the charging speed of an electric vehicle, the size and cost of the protective devices needed to be able to connect to the high-voltage or medium-voltage grid are prohibitive for the deployment of this type of charging station.

To overcome these issues, the Applicant has set up a solution described in WO2021/069188 that allows an electric vehicle fast charging device to be directly connected to primary reserve equipment running on batteries.

To do this, as shown in FIG. 4, a supervisory unit 22 controls an inverter 15a and a DC/DC converter 23a. The inverter 15a is set up between the transformer 21a and the storage batteries 17 so as to form a primary reserve device, as described with reference to FIG. 1. In addition, the converter 23a is connected to the fast charging station 24. Depending on the state of the grid, the supervisory unit 22 ensures both the charging or discharging of the batteries 17 when balancing is needed on the grid and the activates the fast charging station 24 when a need for charging is detected and the injection requirements on the grid are below a threshold value.

Document WO 2021/069188 relates in particular to the connection of the fast charging station 24 on a bus 25 that supplies the storage batteries 17. For this purpose, the converter 23a is connected between the fast charging station 24 and the bus 25.

To measure the power consumed to supply the charging station, and in particular to bill the cost of the charging used, the charging station should have an energy meter. For the solution described with reference to FIG. 4, the energy used to power the fast charging station 24 comes either from the inverter 15a transforming an AC current into a DC current, or from the storage batteries 17, also connected to the DC bus 25. This means measuring the power consumed by the fast charging station 24 using a DC measurement. However, DC measuring devices are rarer and more complex to use than those used for measuring AC. Further, in some countries, such as France, DC meters have not yet been acknowledged as being accurate.

An alternative solution, described in document WO 2021/069189 and illustrated in FIG. 5, is to connect the fast charging station 24 to an additional winding of a transformer 21b with at least three windings. An inverter 23b is placed between the additional winding of the transformer 21b and the fast charging station 24 so as to transform an AC current, taken from transformer 21b, into DC current to ensure a supply to the fast charging station 24.

This solution allows AC current to be withdrawn to supply the fast charging station 24, either directly from the grid and passing through the transformer 21b, or from the storage batteries 17, passing through the inverter 15b and the transformer 21b. In this way an AC current meter can be used to measure the power consumed to supply the fast charging station 24.

However, this solution requires the use of a transformer with an additional winding. It means that this solution is more complex and costly to implement.

The technical problem that the disclosure proposes to solve is therefore to obtain a balancing equipment comprising a fast charging station, which is more economical and simpler to implement than the existing devices and which allows the use of certified energy measuring devices.

SUMMARY

To address this technical problem, some embodiments of the disclosure propose to use a second inverter having an input connected between the transformer and a first inverter feeding power to the storage batteries and whose output is connected to the charging station.

Indeed, a skilled artisan familiar with balancing equipment knows that it is particularly important to limit the harmonics transmitted on the grid and which pass through a transformer connected to a medium or high voltage grid. These harmonics can cause abnormal heating of electrical devices connected to the grid or even damage to these devices.

In addition, a skilled artisan who is aware of balancing equipment is also aware of the fact that to limit the generation of harmonics, the load on each winding of the transformer should be reduced.

Thus, to connect an electric vehicle charging station, the man of the art would use either the solution described in document WO 2021/069188, in which a single winding of the transformer is connected to a single inverter, or the solution described in document WO 2021/069189, in which two separate windings of the transformer are connected to two separate inverters. It follows that he would not attempt to connect two inverters to the same winding of a transformer.

The disclosure stems from the observation whereby connecting two inverters to the same output winding of a transformer connected to the medium-voltage or high-voltage grid generates limited harmonics that still produce the desired results.

Using a second inverter, connected between the transformer and a first inverter, simplifies the system since it dispenses with the need to use a specific transformer or a specific measuring device. Because the second inverter is connected to AC current, it is simple to measure the consumption of the charging station on the AC current consumed by the second inverter, without needing to use a DC measuring device, which is rarer and more complex to implement. In addition it allows the use of a conventional transformer.

Similarly, the disclosure is configured so that the energy from the storage batteries passes through only two inverters, thus dispensing with the transformer. The energy efficiency between the energy taken from the batteries and the energy actually supplied to the charging station is thus improved compared to solutions using a three-winding transformer.

To achieve this, from a first aspect, the disclosure concerns balancing equipment for a high-voltage or medium-voltage grid comprising:
   a grid input incorporating devices for protecting said grid and devices for measuring the performance of said grid as a way of detecting balancing needs;
   a transformer comprising a first winding connected to the output of said grid input and configured to lower the voltage of said grid
   a first inverter connected to a second winding of said transformer and configured to transform an AC voltage into a DC voltage;
   a system of batteries connected to said DC voltage; and a supervisory unit configured to activate said first inverter and to ensure the charging or discharging of said batteries when an unbalance is measured on said grid by said measuring devices.

The balancing equipment also comprises a second inverter connected at the input to the said second winding of the said transformer and at the output to at least one charging point of an electric or hybrid vehicle and means for detecting the charging need of the said charging station, the said supervisory unit being configured to activate the said second inverter when a charging need is detected at the said charging station and when the injection requirements on the grid are below a threshold value.

In this way, the disclosure allows the use of balancing equipment to charge an electric or hybrid vehicle except in phases where a great amount of power should be injected into the grid. In a balancing device, the injection and withdrawal phases are normally relatively short, often lasting only a few tens of seconds. Compared to the charging time of an electric or hybrid vehicle, these withdrawal or injection times are very short.

Compared to a conventional charging station, the charging station implemented by the disclosure is much faster, since it is connected to the high-voltage or medium-voltage grid. Accordingly, although it is not available all the time because the charging station according to the disclosure cannot be used when the balancing equipment has to inject a large amount of power into the grid, the improvement of the charging speed during the other phases more than compensates for the moments in which the charging station cannot be used to charge an electric or hybrid vehicle.

Compared to the fast charging stations of the state of the art, the cost of installing the charging station of the disclosure is also lower since the protection devices necessary to be authorized to connect to the high-voltage or medium-voltage grid are the same for the balancing equipment and the charging station, limiting the number of components necessary to install the charging station.

The disclosure therefore stems from the discovery that the unavailability of the charging station when balancing equipment injection is high is compensated by the gain in charging speed and does not significantly degrade the life of the batteries integrated in electric or hybrid vehicles.

It is known that interruptions in the charging phases degrade the life of the batteries contained in electric or hybrid vehicles. It has in fact been measured that Lithium-ion batteries integrated in electric or hybrid vehicles have a substantially constant life span, even when using a charging station in accordance with the disclosure, e.g. with the moments of unavailability that may occur during the charging phases.

According to one embodiment, said grid performance measuring devices used to detect balancing needs comprise an energy meter dedicated to the manager of said grid and an independent energy meter, said independent energy meter being configured to measure the AC consumption captured at the input of said second inverter. The meter dedicated to the grid operator is conventionally used in balancing equipment as a means to enable the grid operator to check that the balancing equipment is active according to the contract drawn up by the grid operator. For example, the grid operator may have imposed a constraint on the balancing equipment to extract 10% of active power when the frequency exceeds a threshold value or other grid prevention method and, similarly, to extract 10% of reactive power when the voltage exceeds a threshold value or other grid prevention mode. The independent meter is used to check that the service provider complies with the contract. Furthermore, in the context of the disclosure, the independent meter can be used to measure the power withdrawal from the grid to supply the charging station and not to balance the grid.

To use the disclosure, the supervisory unit can be set up to allow injection and withdrawal from the grid while using the same grid to feed the second inverter in the phases not requiring maximum injection. The easiest way to do this is to allow the second inverter to operate when the charging plug is in use and maximum grid injection is not required. In this embodiment, said means for detecting a charging need of said charging plug correspond to a probe configured to detect a consumption on said charging plug.

Preferably, the control of the first inverter and the second inverter may depend on both the balancing needs of the grid and the extraction needs of the charging station. In this way, a compromise can be sought between these two needs when the injection needs on the grid are not maximal.

In this embodiment, said means for detecting a charging need of said charging plug correspond to a probe for measuring the charging power demand on the said charging plug.

Also in this embodiment, said balancing equipment preferentially comprises a probe at the input of said first inverter to measure the instantaneous AC power consumed by said system of batteries, a probe connected to said DC voltage of said system of batteries so as to measure the instantaneous DC power consumed by said system of batteries, and a probe at the input of said second inverter to measure the instantaneous AC power consumed by said charging plug.

With these three sensors, the supervisory unit is able to detect the power used on the first inverter and the second inverter to balance the extraction from the grid according to the extraction needs, to supply the charging plug and to maintain all the batteries at the point of balance corresponding to approximately half the total capacity of each battery.

To this end, according to a second aspect, the disclosure concerns a method of managing balancing equipment according to the first aspect of the disclosure, said method comprising the following steps:

measuring the difference between a voltage measurement, a frequency measurement and a current measurement of the grid and the nominal values to determine the active and/or reactive power injection and/or withdrawal requirements; determining the control power of the first inverter connected to the system of batteries according to the injection and/or withdrawal requirements; if the injection requirements are greater than a maximum injection power, deactivation of the second inverter and activation of the first inverter connected to the system of batteries to inject said maximum injection power, if the injection requirements are less than a maximum injection power, deactivating the second inverter and activating the first inverter connected to the system of batteries to inject said control power, if the withdrawal requirements are less than a recharging power demand at said charging plug and the charge level of the system of batteries is higher than a threshold value, deactivation of the first inverter connected to the system of batteries and activation of the second inverter to withdraw said control power, and if the withdrawal requirements are greater than the charging power requested at said charging plug and the level of charge of the system of batteries is lower than a threshold value, activation of the first inverter and the second inverter until the level of charge of the system of batteries is greater than said threshold value.

The said control power is preferably determined as a function of load losses estimated from measurements from three probes respectively disposed at the output of said first inverter, between said second inverter and said DC voltage and on said DC voltage of said system of batteries.

BRIEF DESCRIPTION OF THE DRAWINGS

The manner of carrying out the disclosure, as well as the advantages arising therefrom, will be evident from the following embodiments, which are given by way of an indication but not a limitation, to support FIGS. 1 to 6, which comprise.

DETAILED DESCRIPTION OF THE PREFERRED EMBODIMENT

Figure 1:
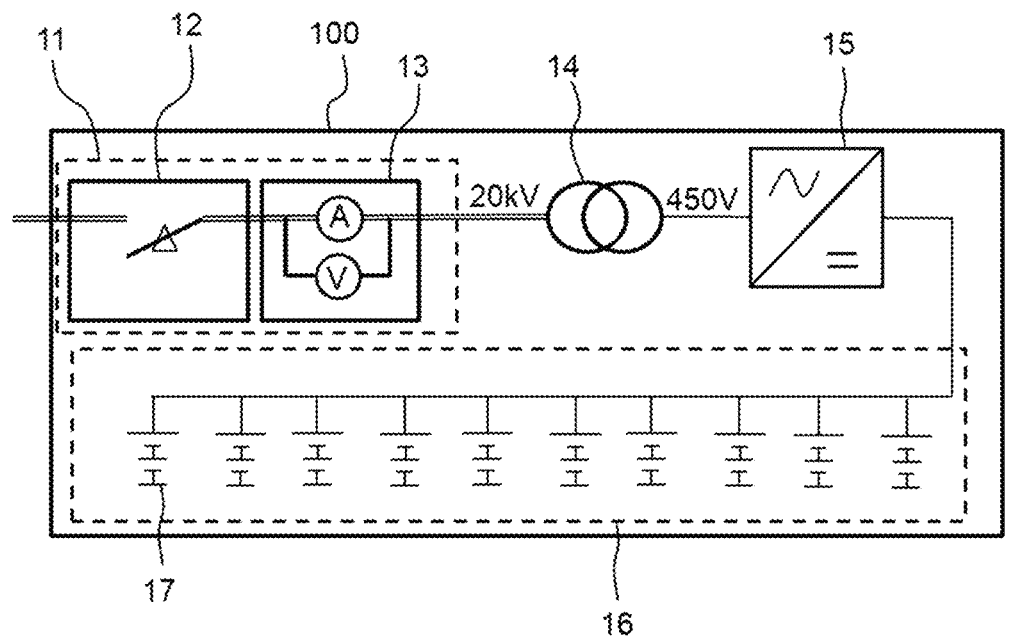
FIG. 1 is a schematic representation of state of the art battery balancing equipment.
Figure 2:
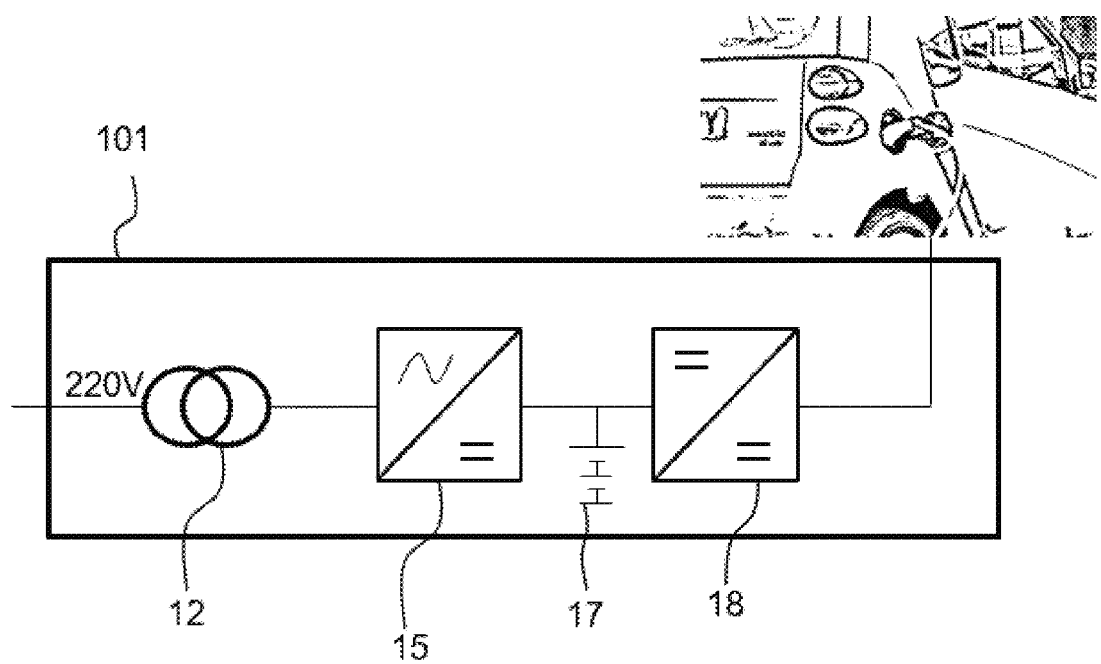
FIG. 2 is a schematic representation of a state of the art battery charging station.
Figure 3:
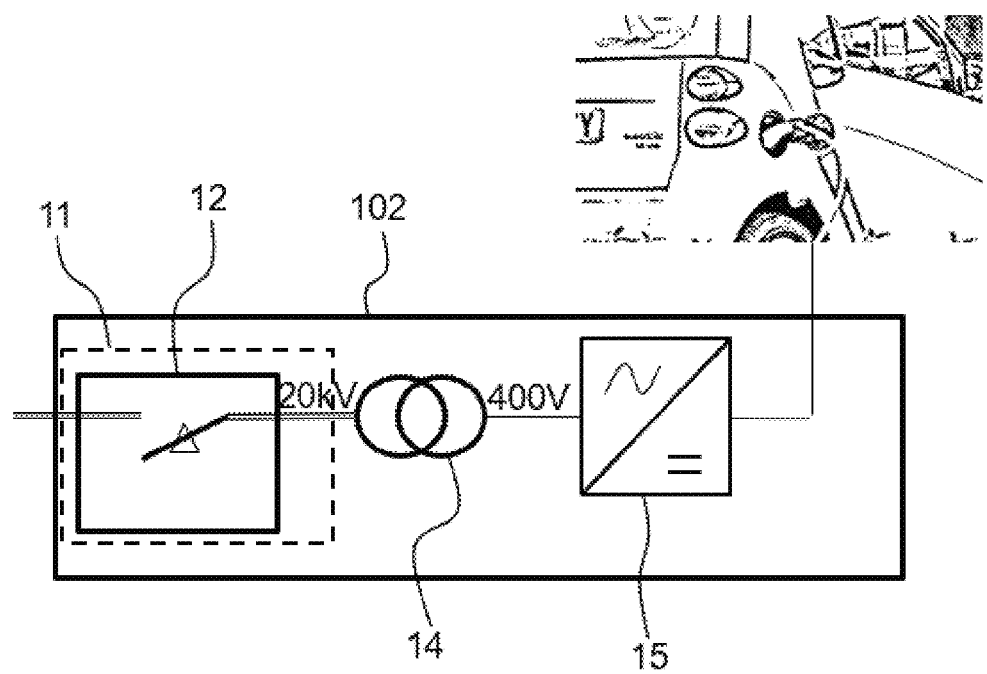
FIG. 3 is a schematic representation of a state of the art "fast" charging station.
Figure 4:
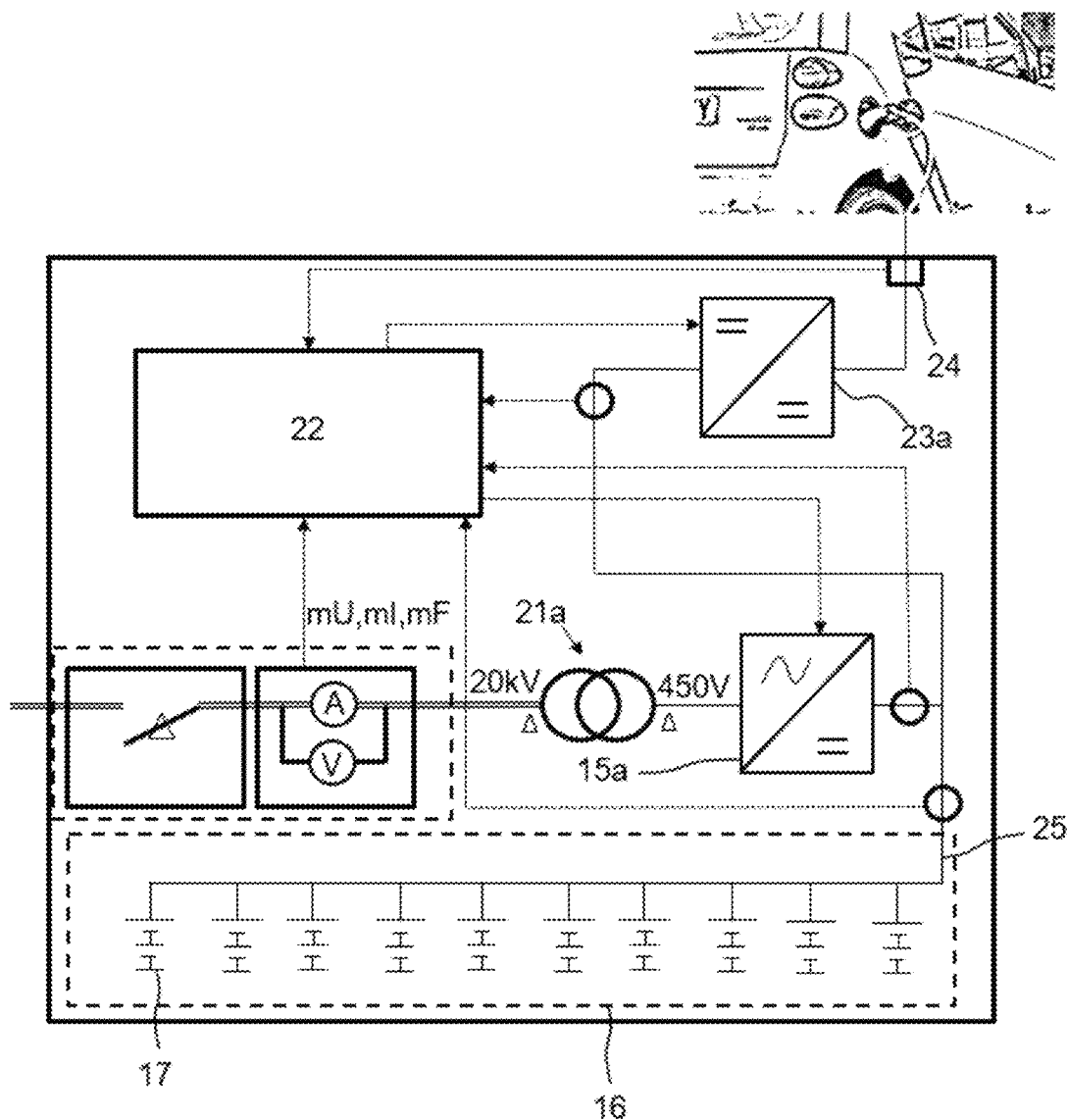
FIG. 4 is a schematic representation of a balancing equipment of the state of the art.
Figure 5:
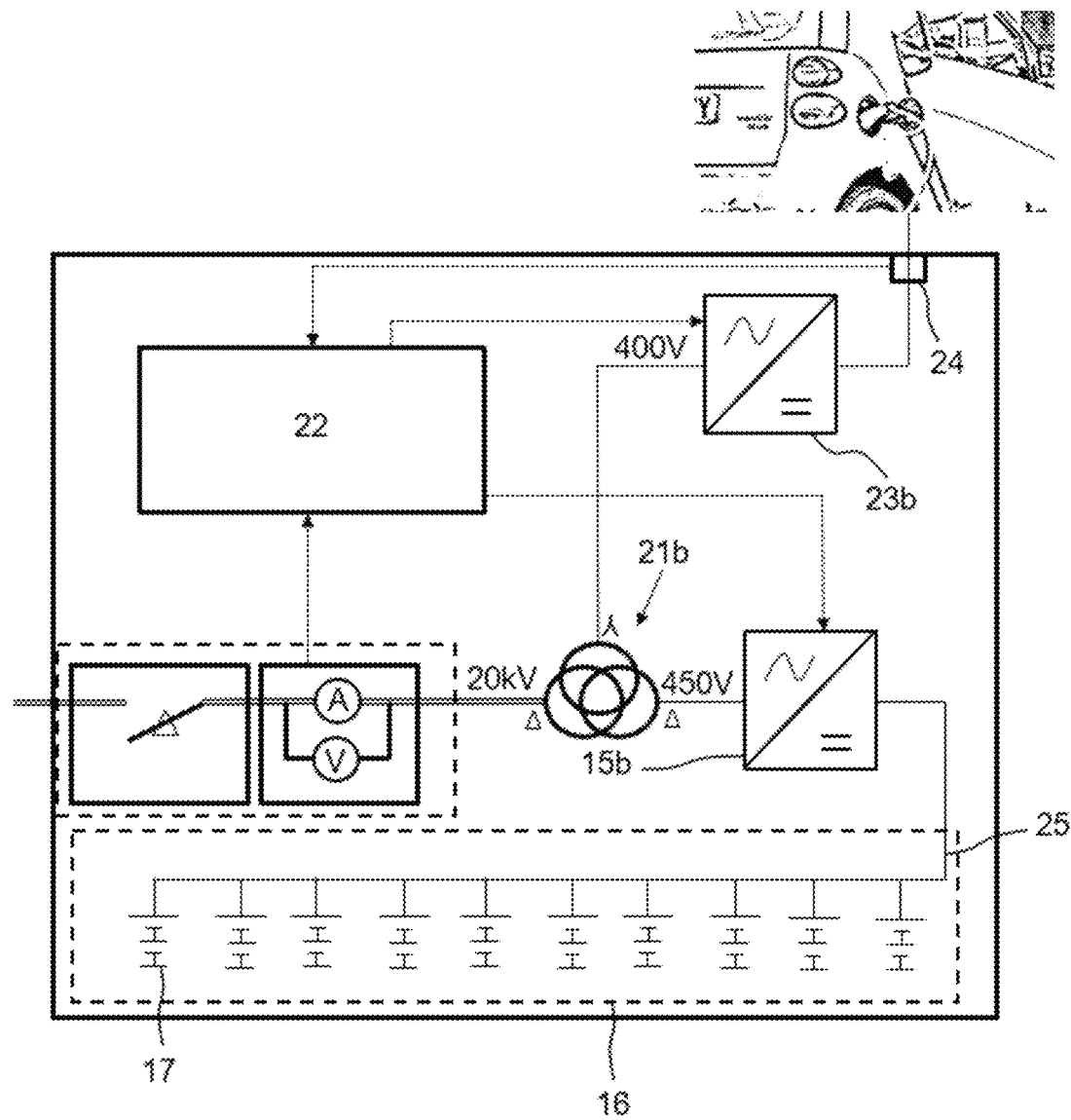
FIG. 5 is a schematic representation of state of the art balancing equipment.
Figure 6:
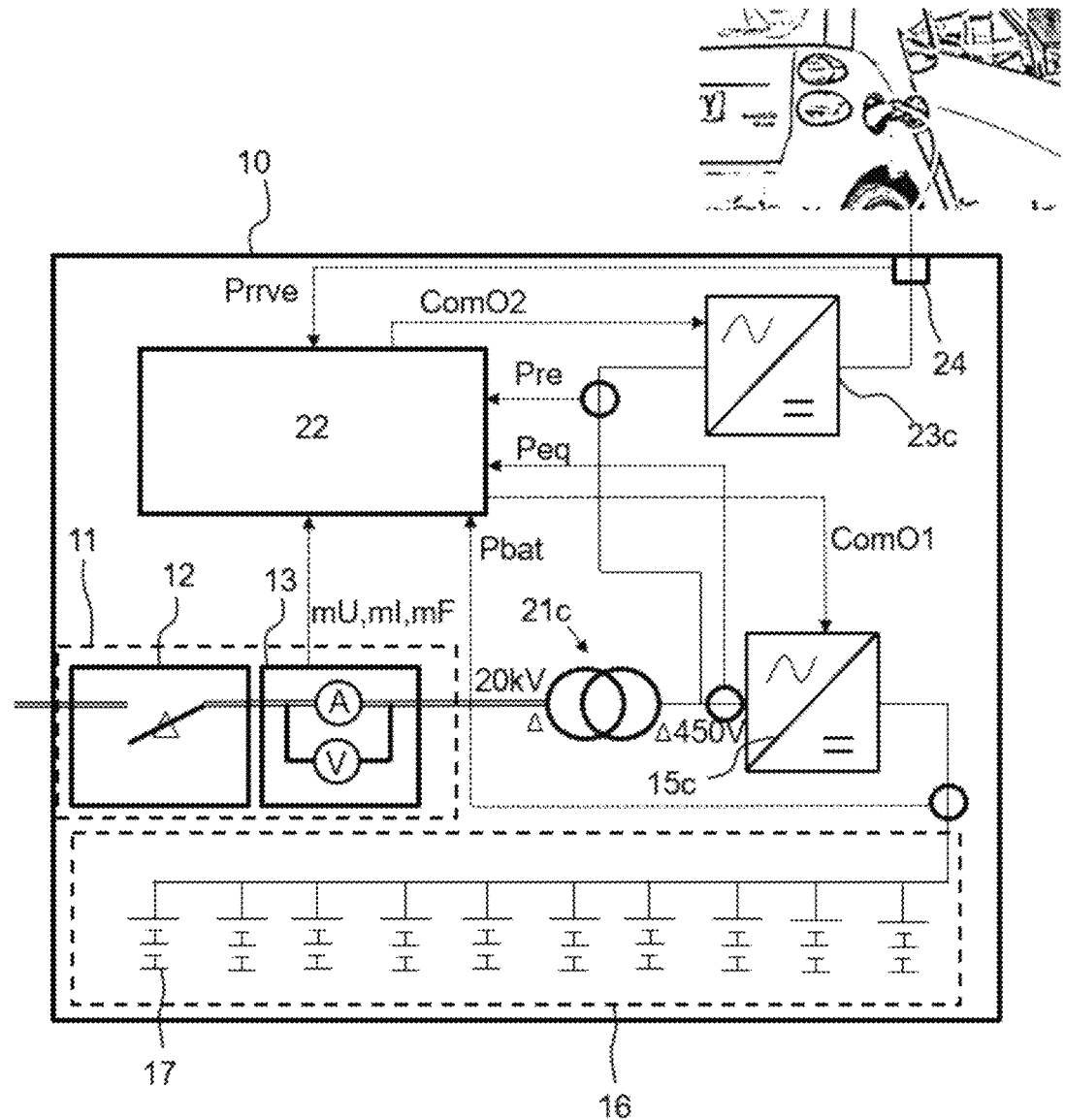
FIG. 6 is a schematic representation of balancing equipment according to some embodiments of the disclosure.

FIG. 6 illustrates balancing equipment 10 that is also a charging station for an electric or hybrid vehicle. This balancing equipment 10 typically comprises a grid input 11 incorporating protective devices 12 and measuring devices 13. The grid input 11 can be connected to the high-voltage or medium-voltage grid. For example, the input of grid 11 may be connected to two separate power cables each carrying 20 kV. In addition, the input of grid 11 may also include a grid output allowing one of the two cables to pass through the input of grid 11 to form a balancing device through which the grid passes.

The protective devices 12 typically correspond to high-voltage or medium-voltage circuit breakers, for example controlled circuit breakers capable of disconnecting 400 A current to protect the balancing equipment 10. Preferably, the grid cables enter the input of grid 11 via manual circuit breakers allowing maintenance operations to be carried out in the balancing equipment 10. An automatic circuit breaker is preferably fitted to the output of these manual circuit breakers so as to cut off the current conducted through the input of grid 11 when the current withdrawal within the balancing equipment 10 is above a threshold value. It is preferable to couple these protective devices 12 with measuring devices 13 so as to detect the times at which the current through the input of grid 11 should be cut off.

These measuring devices also measure the frequency, the voltage and the phase shift between the current and this voltage, all in order to detect the active and reactive power balancing needs of the grid. Preferably, these measuring devices 13 incorporate several energy meters: an energy meter associated with the grid operator and an independent energy meter associated with the operator of the balancing equipment 10. These energy meters are preferably connected to a wired or wireless communication network.

In this way, the grid operator can obtain information about the balancing requirements in real time using the measurements made by the measuring devices 13 of the balancing equipment 10. Similarly, the measurements made by the independent energy meter can be transmitted to the operator of the balancing equipment 10 to control the amount of energy injected into or withdrawn from the grid.

The measuring devices 13 transmit at least three items of information to a supervisory unit 22: a voltage measurement mU, a frequency measurement mF and a current measurement mI, the supervisory unit 22 being configured to calculate the phase shift between the current and the voltage. Alternatively, the measuring devices 13 may include means for automatically detecting the phase shift between voltage and current and this phase shift may be transmitted to the supervisory unit 22. The supervisory unit 22 can be a hardware processor or controller configured to execute specific computer-executable instructions to perform the functions discussed herein.

The function of the supervisory unit 22 is to identify the balancing needs of the grid and to meet these needs according to the state of charge of the batteries 17 integrated in the balancing equipment 10. This supervisory unit 22 may be in the form of a microcontroller or a microprocessor associated with an instruction sequence. Furthermore, this supervisory unit 22 can be remotely controlled, for example by the operator of the balancing equipment 10, in order to update the balancing strategies or the charging authorisations of the electric or hybrid vehicles.

To balance or charge an electric or hybrid vehicle, the input of grid 11 output is connected to a transformer 21c with at least two windings. The first winding is preferably delta-wired and receives the 20 kV grid voltage. This first winding is coupled to a second winding, preferably also delta-wired with a voltage stepped down to 450 V. The transformer 21c may also have a third winding for connecting measuring instruments, for example.

The AC voltage, stepped down to 450 V, is connected to a first inverter 15c, which transforms the AC voltage into a DC voltage that supplies the system 16 of batteries 16. Preferably, the output of the first inverter 15c has a DC voltage level between 700 and 1000 V. The first inverter 15c also transforms the DC voltage of the system 16 of batteries 17 into AC voltage, therefore operating as a bi-directional inverter.

In addition, the AC voltage stepped down to 450 V is also connected to a second inverter 23c, which in turn is connected to the charging plug 24 of an electric or hybrid vehicle. The second inverter 23c transforms the AC voltage, which has been stepped down to 450 V, into a DC voltage that supplies the charging plug 24. It is preferable for the output of the second inverter 23c to have a DC voltage level of 50 V. The second inverter 23c can also transform the DC voltage into AC voltage, for example to use the battery charge when needed to supply the grid, operating as a bidirectional inverter.

In addition to these essential parts of the disclosure, others may be implemented to improve the safety or control strategies of the balancing equipment 10. For example, FIG. 6 illustrates sensors placed after the transformer 21c to measure power at different points in the balancing equipment 10. More specifically, a first probe is set up at the input of the first inverter 15c to measure the AC power Peq consumed by the system of batteries 17. A second probe is arranged at the input of the second inverter 23c to measure the power consumed Pre in AC energy by the charging plug 24. These two sensors, with the measuring device 13, make it possible to assess the losses related to the transformer 21c and to measure the reactive energy, e.g. the phase shift, applied by the first and second inverters 15c, 23c. This second probe can also transmit information about the amount of AC power consumed by the charging plugs 24 to an energy meter.

A probe on the DC voltage of the system 16 of batteries 17 is used for measuring the instantaneous power Pbat in DC energy consumed by the system 16 of batteries 17.

Working jointly with the first probe set up at the input of the first inverter 15c to measure the power Peq, the probe on the DC voltage of the 16 is used for assessing the losses related to the first inverter 15c.

To adapt the balancing strategy of the two inverters 15c and 23c, it is simply necessary to detect consumption or, at least, presence at the charging plug 24 by means of a signal Ep, as shown in FIG. 6. Preferably, the charging power Prrve required by the charging plug 24 is measured by a probe set up at the charging plug 24 to provide information to the supervisory unit 22.

Based on this information, the supervisory unit 22 can determine the strategy to be used by the inverters 15c and 23c.

In addition to these structural items allowing an electric or hybrid vehicle to be charged and the grid to be balanced, the balancing equipment 10 may incorporate conventional parts of balancing equipment, such as a refrigeration unit for cooling the transformer 21c or the system of batteries 17, triggering an alarm or a fire protection unit, etc.

Figure 7:
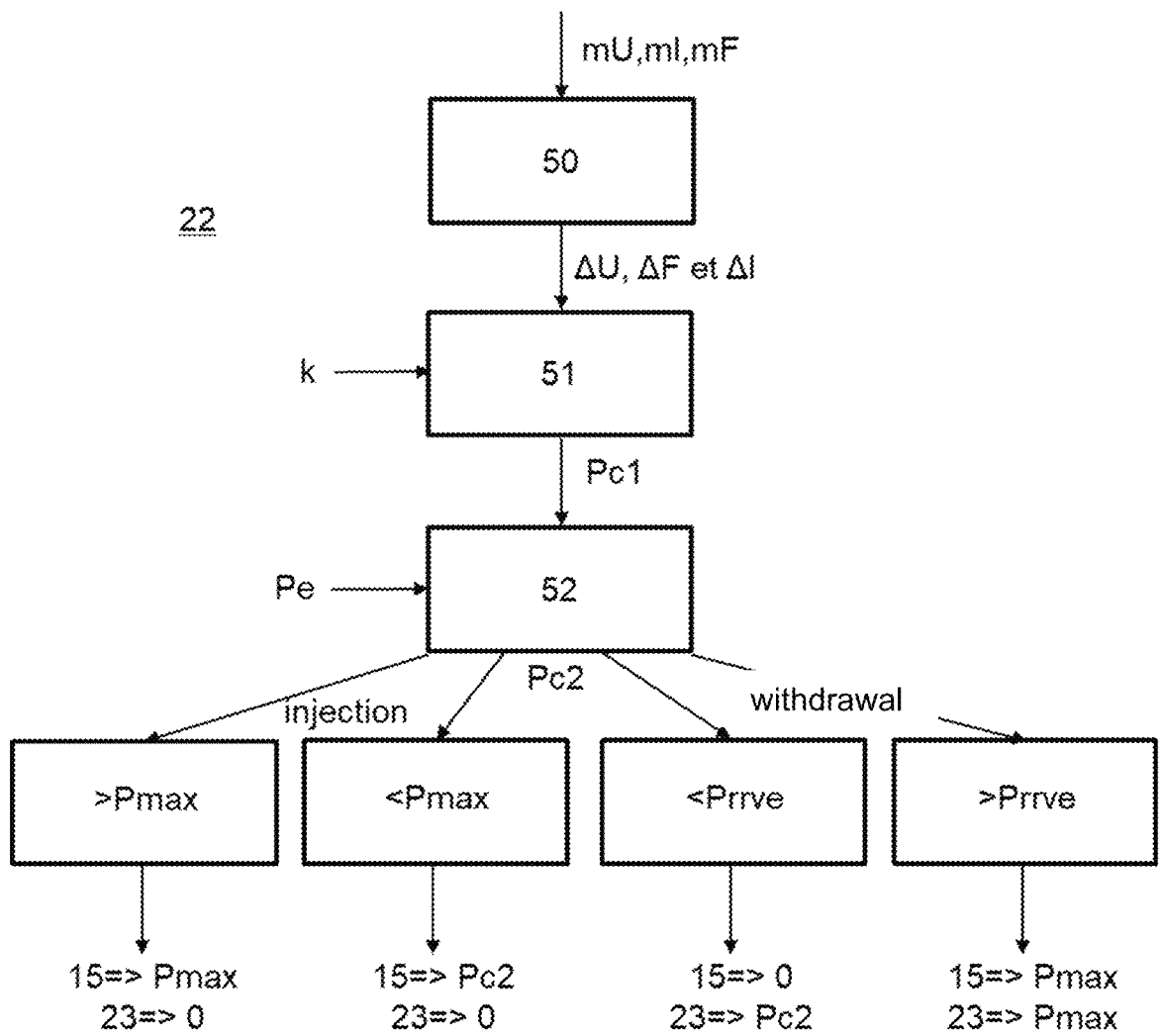
FIG. 7 is a flowchart of the management steps of a supervising device of the balancing equipment in FIG. 6.

FIG. 7 illustrates an example of the management process of the two inverters 15c and 23c implemented by the supervisory unit 22. In a first step 50, this method measures the difference between voltage mU, frequency mF and current mI and nominal values to detect the needs ΔU, ΔI, ΔF of injection or withdrawal on the reactive and/or active power grid. If the difference between a nominal and measured value mU, mF, mI exceeds a threshold value, an injection or withdrawal requirement is determined on the basis of this difference. The second step 51 aims at determining the power to be applied to the first inverter 15c depending on the injection or withdrawal requirements Pc1 and a coefficient k. These requirements Pc1 are then specified in a second determination step 52 by taking into account the real losses at the transformer 21c. These real losses can be estimated by the different sensors depending on the state of the inverters 15c and 23c.

The requirements Pc2 obtained on completion of step 52 can be applied according to several predefined scenarios, for example:

if the injection needs ΔU, ΔF, ΔI are greater than a maximum injection power Pmax, deactivating the second inverter 23c and activating the first inverter 15c connected to the system of batteries 17 to inject the maximum injection power Pmax, if the injection requirements ΔU, ΔF, ΔI are lower than a maximum injection power Pmax, deactivating the second inverter 23c and activating the first inverter 15c connected to the system of batteries 17 to inject the control power Pc1 or Pc2, if the withdrawal requirements ΔU, ΔF, ΔI are lower than a requested charging power Prrve on the charging plug 24 and the charge level of the system of batteries 17 is higher than a threshold value, deactivation of the first inverter 15c connected to the system of batteries 17 and activation of the second inverter 23c to withdraw the control power Pc1 or Pc2, and if the withdrawal requirements ΔU, ΔF, ΔI are greater than a requested charging power Prrve at the charging plug 24 and the charge level of the battery set 17 is less than a threshold value, activating both inverters 15c, 23c until the charge level of the battery set 17 is greater than the threshold value.

The disclosure thus makes it possible to obtain balancing equipment 10 which, in addition to balancing the grid, makes it possible to charge an electric or hybrid vehicle very quickly, since the balancing equipment is directly connected to the high-voltage or medium-voltage grid. The disclosure therefore offers a way of obtaining a "fast" charging station at a lower cost because it reuses existing components in the balancing equipment 10, particularly at the grid input 11. In addition, the disclosure also allows for the use of an easily-implemented transformer 21c and meter for the AC current consumed by the charging plug.

What is claimed is:

1. A balancing equipment for a high-voltage or medium-voltage grid, the balancing equipment comprising:
 a grid input comprising protection devices for said grid and devices for measuring performance of said grid to detect balancing needs;
 a transformer comprising a first winding connected to an output of said grid input and configured to step down the voltage of said grid;
 a first inverter connected to a second winding of said transformer and configured to transform an AC voltage into a DC voltage;
 a system of batteries connected to said DC voltage; and
 a supervisory unit configured to activate said first inverter and to ensure charging or discharging of said batteries when an imbalance is measured on said grid by said measuring devices,
 wherein said balancing equipment further comprises a second inverter connected at the input to said second winding of said transformer and at the output to at least one charging plug of an electric or hybrid vehicle; and
 a detector configured to detect a charging need of said charging plug; and
 wherein said supervisory unit is configured to activate said second inverter when a charging need is detected at said charging plug and injection needs on the grid are lower than a threshold value.

2. The balancing equipment according to claim 1, wherein said detector for measuring the performance of said grid to detect balancing needs comprises an energy meter dedicated to a manager of said grid and an independent energy meter, said independent energy meter being configured to measure AC consumption sensed at the input of said second inverter.

3. The balancing equipment according to claim 1, wherein said detector for detecting a charging need of said charging plug corresponds to a probe for measuring a requested charging power on said charging plug.

4. The balancing equipment according to claim 1, wherein said balancing equipment comprises a probe disposed at the input of said first inverter to measure instantaneous power (Peq) in AC energy consumed by said system of batteries.

5. The balancing equipment according to claim 1, wherein said balancing equipment comprises a probe disposed on said DC voltage of said system of batteries to measure instantaneous power (Pbat) in DC energy consumed by said system of batteries.

6. The balancing equipment according to claim 1, wherein said balancing equipment comprises a probe set up at the input of said second inverter to measure instantaneous power (Pre) in AC energy consumed by said charging plug.

7. A method for managing the balancing equipment of claim 1, said method comprising:
   measuring a difference between a voltage measurement (mU), a frequency measurement (mF) and a current measurement (ml) of the grid and nominal values to determine the injection and/or withdrawal requirements ($\Delta U$, $\Delta F$, $\Delta I$);
   determining control power (Pc1, Pc2) of the second inverter connected to the system of batteries as a function of the injection and/or withdrawal requirements ($\Delta T$, $\Delta F$, $\Delta C$) of active and/or reactive power;
   if the injection requirements ($\Delta T$, $\Delta F$, $\Delta C$) are greater than a maximum injection power (Pmax), deactivation of the second inverter and activation of the first inverter connected to the system of batteries to inject said maximum injection power (Pmax),
   if the injection requirements ($\Delta T$, $\Delta F$, $\Delta C$) are lower than a maximum injection power (Pmax), deactivating the second inverter and activating the first inverter connected to the system of batteries to inject said control power (Pc1, Pc2),
   if the withdrawal requirements ($\Delta T$, $\Delta F$, $\Delta C$) are lower than a requested recharging power (Prrve) on said charging plug and charge level of the system of batteries is higher than a threshold value, deactivating the first inverter connected to a battery set and activating the second inverter to withdraw said control power (Pc1, Pc2), and if the withdrawal requirements ($\Delta T$, $\Delta F$, $\Delta C$) are greater than a requested recharging power (Prrve) at said recharging plug and the charge level of the set of batteries is less than a threshold value, activating the first inverter and the second inverter until the charge level of the system of batteries is higher than said threshold value.

8. The method according to claim 7, wherein the said control power (Pc1, Pc2) is determined as a function of load losses (Pe) estimated from measurements (Peq, Pre, Pbat) taken from three sensors respectively arranged at the input of the said first inverter, at the input of the said second inverter and on the said DC voltage of the said system of batteries.

* * * * *